Patented May 16, 1933

1,909,355

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

METHOD OF CATALYTICAL VAPOR-PHASE OXIDATION OF ORGANIC COMPOUNDS

No Drawing.   Application filed February 13, 1929.   Serial No. 339,742.

This invention relates to improvements of catalysis or more particularly to improvements in the vapor phase catalytic oxidation of organic compounds.

The oxidation of organic compounds has presented a very serious problem in reaction control as the reactions are strongly exothermic and tend to proceed to total combustion. In the past these reactions have been kept in check by careful control of temperature and other reaction conditions such as concentration of oxygen, time of contact, and the like, and especially by the choice of a suitable catalyst. Probably the most effective method of control which has been used consists in the use of so-called stabilized catalysis that is to say, catalysts which have associated therewith compounds of alkali metals, alkaline earth metals and strongly basic earth metals. The oxidation of organic compounds by means of stabilized catalysts is described and claimed in my prior Patent No. 1,709,853 dated April 23, 1929.

The present invention is based on a different method of control of catalytic vapor phase oxidations of organic compounds either to intermediate oxidation products or to the burning out of undesired impurities in mixtures. According to the present invention the compounds or mixtures to be oxidized are admixed with vapors of difficultly oxidizable substances such as for example, carbon tetrachloride, other chlorinated organic compounds, and similar difficultly oxidizable substances. It seems probable that the action of these protective substances is primarily due to a diluting effect and to their relatively higher heat capacity which smooths out the reaction and avoids the bad effects of local superheating. It is also possible that the active oxygen either present in the gas stream or bound in the catalyst is to a certain extent masked by the presence of the difficultly oxidizable vapors. It is of course extremely difficult to obtain accurate information as to exactly what is going on in a vapor phase catalytic oxidation and it is possible that other factors may play a part and, therefore, the invention is in no sense limited to the above theory of action which is advanced merely as the best explanation of the process in the light of present knowledge.

While it is an advantage of the present invention that improved yields of intermediate products or improved purification of mixtures are obtained by the use of difficultly oxidizable protective vapors alone, it is frequently desirable to combine the effects of the present invention with the methods of control which have hitherto been used, thus it is desirable to choose the best methods of temperature control, oxygen concentration, time of contact, and particularly nature of contact mass. The present invention can be very effectively used in conjunction with stabilized contact masses described in my co-pending application referred to above and particularly in the highly effective contact masses containing base exchanging silicates or complex compounds which contact masses are described in my prior Patents No. 1,694,122 dated December 4, 1928, No. 1,735,763 dated November 12, 1929 and 1,722,297 dated July 30, 1929 and my co-pending applications, Serial No. 294,597 filed July 21, 1928 and Serial No. 336,335 filed January 31, 1929.

It is also frequently desirable to recirculate the reaction gases after removing part or all of the reaction product and circulatory processes in which the principles of the present invention are used are included in the present application and are of great importance in certain delicate reactions.

The present invention may be applied to organic oxidations of the most various types, including reactions in which an intermediate product is obtained and also those in which certain constituents are removed from mixtures by total combustion. A few representative reactions which can be carried out by means of the present invention are the following:

1. Reactions in which an intermediate oxidation product is produced. The oxidation of benzol, toluol, phenol, tar phenols or furfural and other compounds containing the group —CH—CH=CH—CH to maleic acid and fumaric acid or mesotartaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone, diphenic acid, phthalic anhydride and maleic acid; acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impurity is burned out, such as the purification of crude anthracenes of various degrees of impurity with total combustion of carbazole, dead oils and in some cases phenanthrene; purification of crude naphthalenes and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes, and the like to intermediate products such as anthraquinone, phenanthraquinone, diphenic acid, phthalic anhydride, and the like with concomitant removal of carbazole and dead oils by total combustion; the oxidation of crude tar acids to maleic and fumaric acids with the combustion of certain impurities, etc.

The invention will be described in greater detail in connection with the following specific examples, but is not limited to the details therein set forth.

*Example 1*

250 volumes of 8–12 mesh aluminum granules are coated with 24 parts by weight of ammonium metavanadate. Preferably the coating is effected by dissolving the ammonium metavanadate in water at 90° C. and spraying on the granules which are stirred and heated to a temperature at which the water is immediately vaporized on contact. A very uniform coating is obtained in this manner.

The contact mass is filled into a tubular bath converter having tubes from ½–¾ inches in diameter, the catalyst being 4–8 inches deep. The contact mass is calcined in an air stream at 450° before use and this calcination may take place in the tubes or before the catalyst is filled in. A bath should be used which preferably boils at about the temperature desired for the reaction. Examples of such baths are mercury, with or without provisions for varying the pressure on it, or mercury alloys, such as mercury cadmium or mercury lead alloy, the proportion being preferably so chosen that the alloy boils at the desired temperature.

The contact mass can be used in the preparation of maleic or mesotartaric acid by the catalytic oxidation of benzol, phenol, tar phenols, furfural, phthalic anhydride, and other compounds containing the grouping:

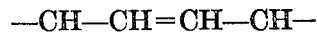

The compounds are vaporized into an oxygen containing gas together with difficultly oxidizable hydrocarbons or other compounds such as anthraquinone, carbon tetrachloride, and other halogenated aliphatic or aromatic hydrocarbons. The vapors are passed over the contact mass at a bath temperature of 380–400° C., good yields of maleic acid being obtained and the yields being considerably better than when no protecting agent is used.

The oxidizing gas used may be air or an artificial mixture in which the amount of oxygen is just about sufficient for the production of maleic acid. If desired the process may be carried out in a circulatory manner. When the above reaction is carried out with benzol as the raw material preferably 5 parts of benzol and 5 parts of carbon tetrachloride are vaporized into 50 parts of air. Yields of from 50–60% of maleic acid are obtained. If furfural is used instead of benzol, the same proportions are suitable, but the reaction product will contain a mixture of maleic and mesotartaric acid. When the reaction is carried out in a circulatory manner the product should be separated out before recirculation and excess gases may be vented after washing with water.

The vanadium pentoxide in the contact mass may be partly or wholly replaced by one or other metal oxides of the 5th and 6th groups of the periodic system, salts may be used singly or in admixture, such as aluminum, titanium, iron, cobalt, or zirconium salts.

*Example 2*

In the catalytic purification of crude aromatic hydrocarbons a protective agent greatly improves the process by preventing attack on the hydrocarbons which it is desired to purify. For example, when crude phenanthrene is to be catalytically purified by burning out impurities such as carbazol, dead oils and the like, anthracene may be used as a protective agent. Under the same reaction conditions the amount of phenanthrene burned up when anthracene is present is much lower than when anthracene is absent.

A catalyst is prepared by precipitating 8.7 parts of ferric oxide and 8 parts of titanium oxide from their salt solutions by means of alkali. The mixture of the oxides is suspended in 100 parts of water and 14.2 volumes of 10 N. potassium hydroxide solution is added, the suspension then being coated onto 200–250 volumes of pea-size pumice fragments in the usual manner and the contact mass calcined at 400–500° C. A crude phenanthrene containing from 30–50% anthracene and 15–20% carbazol is vaporized in air in the ratio of 1:30 and passed over the contact mass, for example, in a bath converter with a bath temperature of 380° C. A purified phenanthrene is obtained. The carbazol content is reduced to 3.5%. At 400° C. only 1.4% carbazol remains and at 420–440° C. no carbazol at all is shown by Kjeldahl analysis. The anthracene is practically not attacked at all and can be readily separated from the phenanthrene by the use of any of the known phenanthrene solvents, such as, benzol, toluol, solvent naphtha, furfural, acetone, cyclohexane, orthodichlorbenzol, etc. The phenanthrene obtained from the solvent is from 90–95% pure and of a pale yellow color. On recrystallization from one or more of these solvents chemically pure phenanthrene is obtained having a melting point of 100° C.

The ferric oxide in the contact mass may be partly or wholly replaced by one or more of other metal oxides such as cobalt oxide, copper oxide or nickel oxide. The titanium oxide which acts as a stabilizer promoter, that is to say, a nonspecific catalyst for the reaction may be replaced by other oxides which are known as dehydrogenating or dehydrating catalysts. The function of such oxides is to extend the stabilizing action of the potassium hydroxide, that is to say, to further its action in preventing combustion of phenanthrene without diminishing the activity of the catalyst for the oxidation of the carbazol. The potassium hydroxide is a stabilizer and may be replaced by other hydroxides or compounds of the alkali or alkaline earth metals, for example, potassium nitrate or potassium nitrite may be used.

Instead of using the contact mass described above complex compounds of high molecular weight may be used, such as, zeolites or non-siliceous base exchange bodies. The zeolites may be prepared by reaction of waterglass with alkali metal metallates and/or metal salts, the reaction being maintained neutral or faintly alkaline to phenolphthalein. Non-siliceous base exchange bodies may be prepared by the reaction of alkali metal metallates of amphoteric metal oxides with metal salt solutions under conditions of neutrality or faint alkalinity to phenolphthalein, thus for example, a solution of potassium aluminate may be treated with a solution of cobalt nitrate or ferric nitrate or a mixture, the proportions being such that the reaction mixture remains neutral or faintly alkaline to phenolphthalein. Other base exchange bodies or their derivatives described in the patent and applications above referred to as contact masses for the purification of anthracene and phenanthrene may be used.

Instead of and particularly in addition to the anthracene, small amounts of ammonia may be used as an additional protective agent.

*Example 3*

300 parts of $V_2O_5$ are intimately mixed with 93.186 parts of silver nitrate melted and permitted to cool, the cooling melt puffing up with evolution of oxygen. After cooling the melt is broken into pea-size fragments and constitutes a silver vanadyl vanadate which is a non-siliceous base exchange body. Instead of preparing a silver vanadyl vanadate, the corresponding vanadyl vanadates of the alkali metals may be prepared having preferably the following ratio of $V_2O_5$ to the base:

$V_2O_5$ to $Na_2O$ as 6:1
$V_2O_5$ to $K_2O$ as 5:1
$V_2O_5$ to $Li_2O$ as 2:1
$V_2O_5$ to $Rb_2O$ as 5:1
$V_2O_5$ to $Cs_2O$ as 5:1

The vanadyl vanadates may of course also be made by wet methods and it is frequently desirable to replace part of the alkali by base exchange, 5–10% solutions of aluminum sulfate, copper sulfate, iron sulfate, and the like being permitted to trickle over the fragments of the base exchange body at room or elevated temperatures.

Instead of using the above non-siliceous base exchange bodies in a concentrated form they may be powdered and coated onto fragments of neutral or artificial carrier material or if they are prepared by wet methods they may be diluted with materials during formation. Carrier materials which are rich in silica such as quartz fragments, quartz filter stones, diatomaceous stones, pumice fragments, fragments of neutral or artificial silicates, base exchanging or non-base exchanging, especially zeolites or non-siliceous base exchange bodies diluted with materials rich in silica are very suitable. Aluminum granules or granules of metal alloys such as, ferrosilicon, ferro-vanadium and the like may also be used. Instead of coating the preformed base exchange body onto the carrier fragments the base exchange body may be produced thereon by reaction of the necessary components.

In some cases adhesive materials are required to insure a strong, durable coating and for such purposes compounds of the alkali metals or alkaline earth metals may be used, for example, about 10% of potassium sulfate or potassium nitrate. These cementing agents also act as stabilizers and stabilizer promoters, may also be added if desired to still further tone the catalyst. Examples of suitable stabilizer promoters are aluminum oxide, titanium oxide, thorium oxide, etc.

Silver vanadyl vanadate prepared as described above is coated onto pumice fragments and filled into a converter as described in Example 1. Toluene is then vaporized into an air stream together with chlorinated aliphatic or aromatic hydrocarbons and passed over the contact mass at a bath temperature of 380° C. Good yields of benzoic acid and benzaldehyde are obtained. An example of suitable proportions are 150 liters of air containing 10.2 grams of toluene and 5 grams of dichlorethane per converter tube per hour. The reaction product contains considerable quantities of unchanged toluene which can be readily recovered and reused. Small amounts of benzaldehyde are also present in the reaction mixture and the reaction may advantageously be carried out in a circulatory manner so that the unchanged toluene and the dichlorethane may be reused after separation of the benzaldehyde and benzoic acid.

Other side chain aromatic compounds may be oxidized under similar conditions. For example, cresol may be oxidized to salicylaldehyde and salicylic acid. Halogen- and nitro- substituted toluenes may be oxidized to the corresponding benzaldehyde and benzoic acids. Xylene, pseudocumene, mesitylene, paracymene and their derivatives may also be oxidized to the corresponding aldehydes and acids. Hydrocarbons which do not contain side chains may also be oxidized. for example, naphthalene to alpha-naphthoquinone; acenaphthene to naphthalic anhydride; fluorene to fluorenone, etc. In every case the yields are much better than when no protecting agent is used.

Instead of using chlorinated hydrocarbons as protecting agents in the reactions described above, anthraquinone may be used and is very effective particularly in oxidation of toluene to benzaldehyde and benzoic acid.

In the foregoing examples, certain contact masses have been described in detail as being suitable for the specific reactions mentioned, but it is to be understood that the principles of the invention may be applied to any vapor phase organic oxidation, irrespective of the type of catalyst used. In the claims the term "suitable oxidation contact mass" is used to refer to any known or preferred contact mass which will catalyze the particular reaction being carried out, it being apparent that for each reaction certain catalysts are better suited than others.

This application is in part a continuation of my prior application Serial No. 230,694, filed November 2, 1927.

What is claimed as new is:

1. A method of catalytically oxidizing organic compounds in the vapor phase, which comprises vaporizing the organic compound, admixing the vapors with an oxidizing gas and a protective vapor other than a complete oxidation product of the reaction mixture which is much more difficultly oxidizable at the same temperature than the organic compound to be oxidized, and subjecting the mixture of vapors to the action of an oxidation contact mass at an elevated temperature.

2. A method according to claim 1, in which the organic compound is a side chain aromatic compound.

3. A method according to claim 1 in which the organic compound is a toluene compound.

4. A method according to claim 1, in which the gases after passing through the converter are subjected to a treatment which separates out at least part of the oxidation product obtained, and the remaining gases after adjustment of composition are recirculated.

5. A method according to claim 1, in which the contact mass used contains at least one compound of an alkali-forming metal.

6. A method according to claim 1, in which the amount of oxygen in the oxidizing gas is less than that in air.

7. A method according to claim 1, in which the protective agent used is a chlorinated organic compound.

8. A method according to claim 1 in which the protective agent used is a chlorinated aliphatic compound.

9. A method according to claim 1 in which the protective agent is carbon tetrachloride.

10. A method of catalytically oxidizing organic compounds in the vapor phase, which comprises vaporizing the organic compound, admixing the vapors with an oxidizing gas, and subjecting the mixture of vapors to the action of an oxidation contact mass containing at least one vanadyl vanadate.

11. A method of catalytically oxidizing organic compounds in the vapor phase, which comprises vaporizing the organic compound, admixing the vapors with an oxidizing gas, and subjecting the mixture of vapors to the action of an oxidation contact mass containing at least one puffed vanadyl vanadate.

12. A method according to claim 10, in which the compound to be oxidized is an organic hydrocarbon.

13. A method according to claim 11, in which the compound to be oxidized is an organic hydro carbon.

14. A method according to claim 10, in which the material oxidized is naphthalene.

15. A method according to claim 11, in which the material oxidized is naphthalene.

16. A method according to claim 10, in which the material oxidized is anthracene.

17. A method according to claim 11, in which the material oxidized is anthracene.
18. A method according to claim 10, in which the material oxidized is acenaphthene.
19. A method according to claim 11, in which the material oxidized is acenaphthene.

Signed at Pittsburgh, Pennsylvania, this 9th day of February, 1929.

ALPHONS O. JAEGER.